United States Patent
Hutchins et al.

[11] Patent Number: 6,078,273
[45] Date of Patent: *Jun. 20, 2000

[54] INFUSION PUMP MONITORING ENCODER/DECODER

[75] Inventors: Geoffrey Hutchins, Kesgrane; Tim Allen, Poole, both of United Kingdom

[73] Assignee: Baxter International Inc., Deerfield, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,276

[22] Filed: Jan. 22, 1997

[30] Foreign Application Priority Data

Oct. 29, 1996 [GB] United Kingdom ............... 9622434

[51] Int. Cl.[7] .................................................. H03M 1/22

[52] U.S. Cl. ........................... 341/13; 318/640; 341/11

[58] Field of Search .................................. 341/13, 9, 11, 341/15; 318/640

[56] References Cited

U.S. PATENT DOCUMENTS

| | | | |
|---|---|---|---|
| 4,864,125 | 9/1989 | Minami et al. | 318/640 |
| 4,869,646 | 9/1989 | Gordon et al. | 417/18 |
| 5,003,239 | 3/1991 | Matthews et al. | 318/600 |
| 5,117,105 | 5/1992 | Nagase et al. | 341/13 |
| 5,130,710 | 7/1992 | Salazar | 341/11 |
| 5,171,983 | 12/1992 | Roberts et al. | 341/13 |
| 5,243,187 | 9/1993 | Hettlage | 341/13 |
| 5,250,885 | 10/1993 | Kabeya | 318/560 |
| 5,279,556 | 1/1994 | Goi et al. | 604/67 |
| 5,438,330 | 8/1995 | Yamazaki et al. | 341/13 |
| 5,444,613 | 8/1995 | Tani et al. | 341/13 |
| 5,482,438 | 1/1996 | Anderson et al. | 417/44.1 |

*Primary Examiner*—Jeffrey Gaffin
*Assistant Examiner*—Kim N. Huynh
*Attorney, Agent, or Firm*—P. E. Schaafsma; F. C. Kowalik

[57] ABSTRACT

The present invention provides a method and apparatus for monitoring an infusion pump (10). The method and apparatus provides an encoder (101) which is used with a motor (65) of the infusion pump (10) and a monitoring method which effectively provides rotational directional information. The present invention utilizes a state transition of a first switch (111) indexed against a constant signal from a second switch (113) corresponding to the center of a flag (117) or sector (119).

21 Claims, 6 Drawing Sheets

INFUSION PUMP MONITORING ENCODER/DECODER

The present invention relates to positional encoder/decoders associated with motor shafts in medical infusion pumps.

BACKGROUND OF THE INVENTION

The administration of intravenous medical fluids to a patient is well known in the art. Typically, a solution such as saline, glucose or electrolyte contained in a glass or flexible container is fed into a patient's venous system through a conduit such as a polyvinyl chloride (PVC) intravenous (IV) tube which is accessed to the patient by a catheter. Many times, the fluid is infused under the forces of gravity, and the rate of flow is controlled by a roller clamp which is adjusted to restrict the flow lumen of the IV tube until the desired flow rate is obtained.

Flow from the container to the patient also is known to be regulated by means other than a roller clamp. It is becoming more and more common to use an electronically controlled infusion pump. Such infusion pumps include, for example, peristaltic-type pumps and valve-type pumps. Valve-type pumps employ pumping chambers and upstream and downstream valves to sequentially impart the propulsion to the fluid. Peristaltic-type pumps typically include an array of cams angularly spaced from each other which drive cam followers connected to pressure fingers. These elements cooperate to impart linear wave motion on the pressure fingers. This linear wave motion is used to apply force to the IV tube, which imparts the motion to the fluid in the IV tube, thereby propelling the fluid. An alternative type of peristaltic pump employs a plurality of roller members which roll over the IV tube to impart the motion to the fluid in the IV tube. Such infusion pumps include various motors. Examples of such motors include driving motors which drive the pumping hardware and tube loading motors which drive tube loading hardware. Such driving motors can be variable speed motors.

The accurate monitoring of the motors of such infusion pumps with closed loop control systems is desirable in a number of areas. For example, infusion pumps in the art have the potential for mechanical effects on the rotation of the motor during the pumping period. Such mechanical effects can be caused by, for example, temperature variations, variable battery power, motor friction, tubing variances and peak torque requirements. When detected, such mechanical effects can be solved by adjusting power supplied to the motor to compensate for the torque variation. Another area in which accurate monitoring is important is in monitoring the direction and rotation of the motor. Pump motors can move in an abnormal direction as a result of, for example, improper application of the driving signal. When such abnormal operation occurs, it is desirable to signal such abnormal operation so correction can be made.

Use of closed loop control systems which employ positional transducers on the motor shaft to monitor infusion pump motors is known in the art. Such electromechanical position encoder/decoders generally comprise a quadrature shaft encoder whose two outputs sense the presence or absence of an idicia or a flag to indicate motor shaft positional information relative to some starting point. Use of two channels generating quadrature signals allows the direction as well as the distance moved to be monitored and is further known in the art. The resolution of the monitoring information is determined by the number of flags on the encoder wheel. A decoder such as an up-down counter preceded by an appropriate state decoding circuit is used to process the signals from the encoder. The state decoding logic samples the input signals at a rate which ensures that, at the maximum signal frequency, consecutive states are guaranteed to be sampled. The up-down counter output provides positional information relative to the starting position.

Such motor shaft encoder/decoders of the prior art, however, suffer from several drawbacks. The input signals are asynchronous to the decoder clock, and if the state decoder logic samples the input signals at the signal edge, the decoder may enter a metastable state which is indeterminate and may result in incorrect updating of position. While the likelihood of metastability occurring can be reduced to acceptable levels by appropriate digital design techniques known in the art, implementation of these techniques increases the cost of such systems.

Thus, what is needed is a motor shaft encoder/decoder which avoids the issue of metastability during state transitions of the signals from a quadrature shaft encoder. The encoder/decoder also should effectively gather rotational directional information. Additionally, such a device should avoid use of a separate counter or clock. The device should provide these benefits in a cost efficient and effective design.

SUMMARY OF THE INVENTION

The present invention provides an encoder/decoder which effectively gathers rotational directional information. The present invention obviates the necessity for separate circuit for counting state transitions of the encoder/decoder. The present invention provides these benefits with an efficient, cost effective design. The present invention achieves these advantages by utilizing a state transition of a first sensor to initiate a sample of a constant signal from a second sensor corresponding to the center of a flag or sector.

DETAILED DESCRIPTION OF A PREFERRED EMBODIMENT

Figure 1:
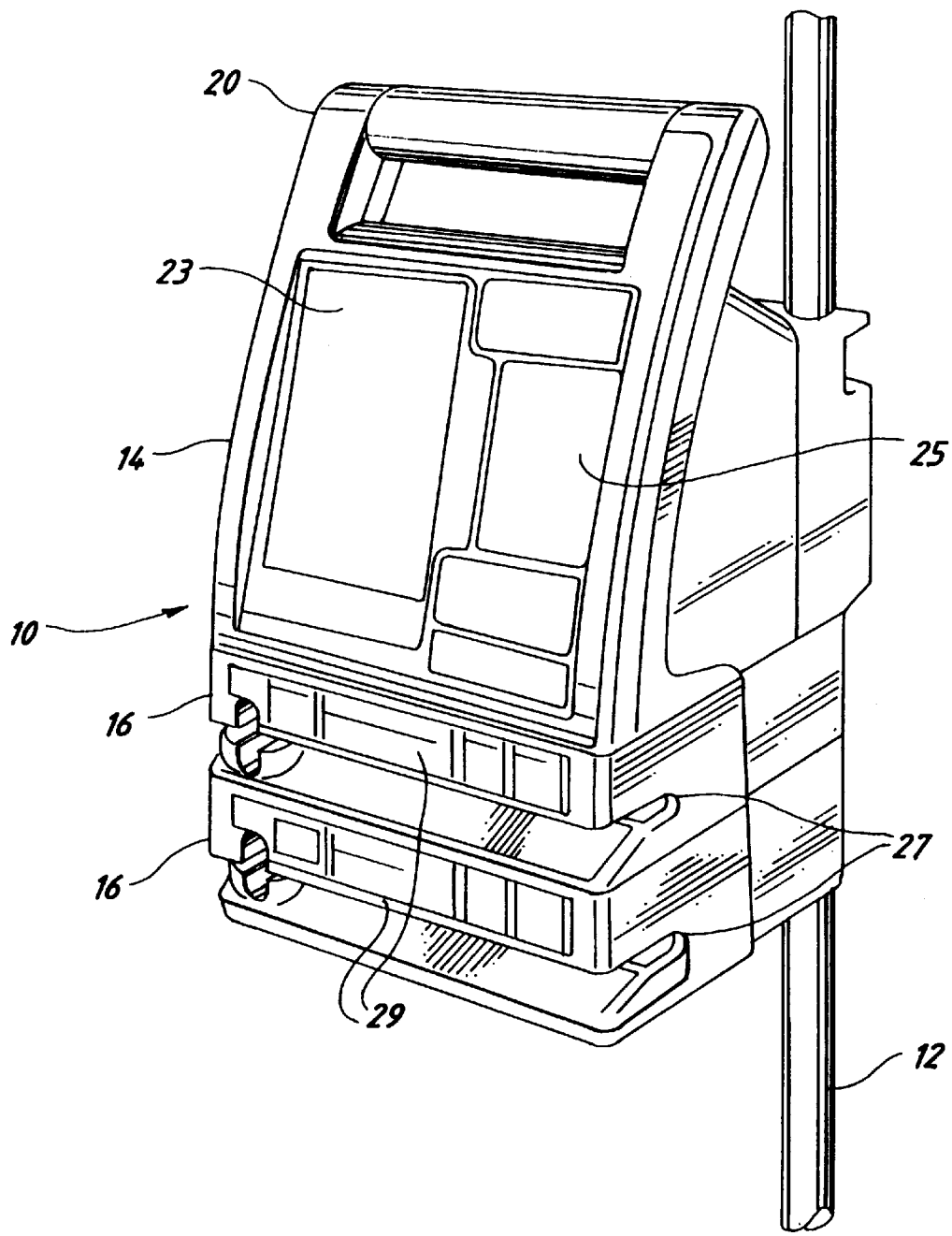
FIG. 1 is a perspective view of an infusion pump in which the present invention can be utilized.

Referring to FIG. 1, an infusion pump in which the present invention can be utilized is referred to generally as 10. The infusion pump 10 can be clamped onto a standard IV pole 12. The infusion pump 10 includes a main body portion 14 and at least one pump module portion 16. In the embodiment depicted and described herein, two pump module portions 16 are provided.

Formed at the upper periphery of the main body portion 14 is a carrying handle 20. The main body 14 further includes a liquid crystal display (LCD) area 23 which is used to convey various information about the infusion pump 10 to the user and provide for user interface with the infusion pump 10. The main body 14 includes data-entry keys 25. The pump module 16 includes a tube-loading channel 27 and an vacuum fluorescent display area 29. The tube loading channel 27 utilizes an automatic tube loader described below.

The main body portion 14 includes a slave microprocessor which is a slave to a master microprocessor. In a preferred embodiment, the master microprocessor is a 80C186 EB available from Intel Corporation, Santa Clara, Calif., and the slave microprocessor is a 80C552 available from Phillips Semiconductors, Sunnyvale, Calif. The pump modules 16 further include a pump module microprocessor. In a preferred embodiment, the pump module microprocessor is a 68 HC11 available from Motorola, Schaumburg, Ill. The pump module microprocessor includes software in read-only memory (ROM) which drives the monitoring functions described below.

Figure 2:
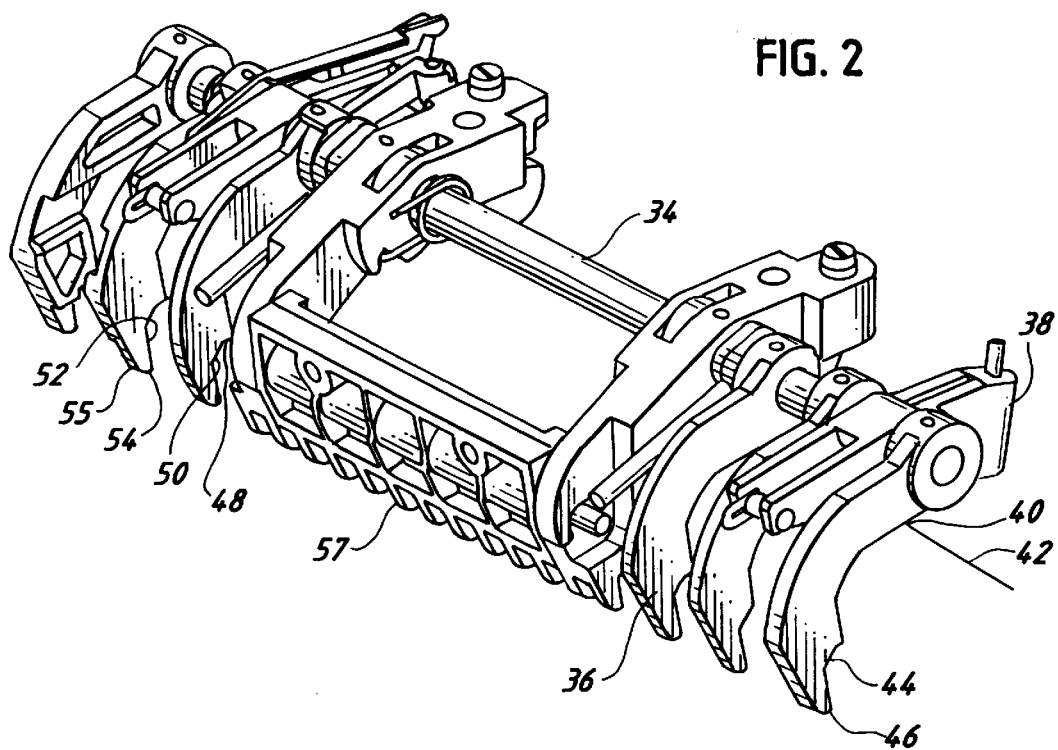
FIG. 2 is a perspective view of a portion of the pump hardware-assembly of the infusion pump of FIG. 1.
Figure 3:
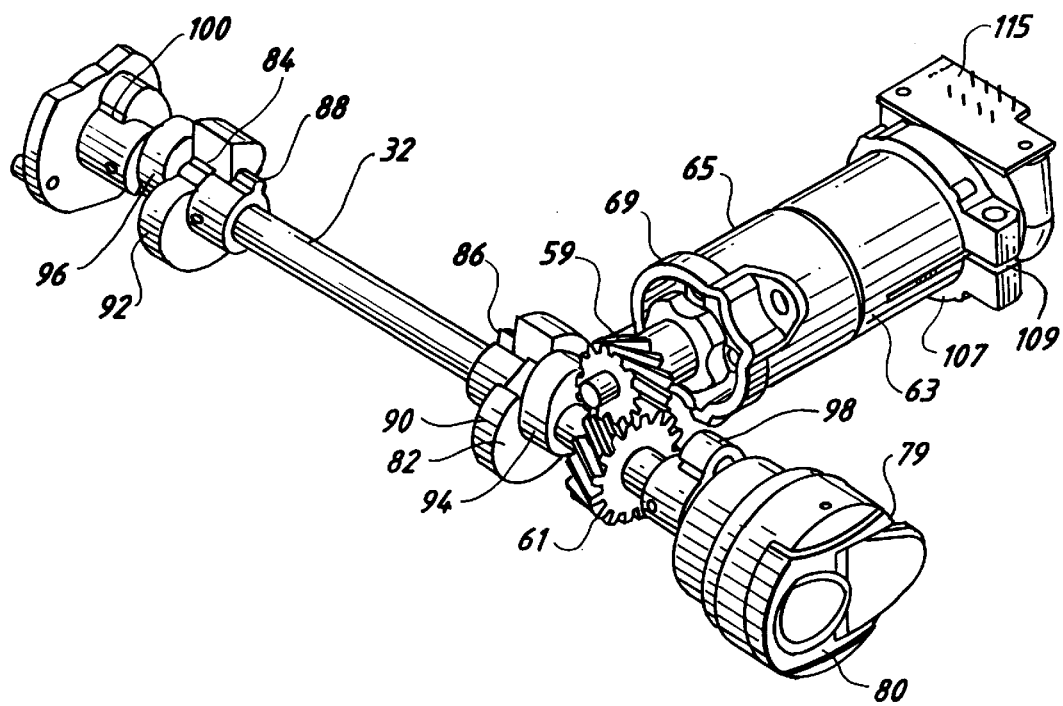
FIG. 3 is an exploded view of a further portion of the infusion pump hardware-assembly of the infusion pump of FIG. 1.

As shown in FIGS. 2 and 3, the tubeloader sub-assembly is mounted on two shafts. These two shafts are the tubeloader camshaft 32 and the tubeloader layshaft 34. The tubeloader layshaft 34 provides an axis about which parts driven by camshaft 32 rotate. Moving upstream along layshaft 34, the most outboard of the elements associated therewith are the downstream tubeloader pawls 36. The downstream tubeloader pawls 36 each consist of an annular body 38 which is adapted to ride fixed on the tubeloader layshaft 34.

Extending forward of the pawl annulus 38 is the pawl arm 40. The pawl arm 40 has a substantially linear section 42 and an arctuate section 44 extending outwardly and downward from the pawl collet 38. The pawl tip 46 encompasses a plurality of areas. The interior side of the pawl tip 46 defines a horizontal tube engaging surface 48, an angled tube engaging surface 50, a vertical tube capture surface 52, and a horizontal tube misload activating surface 54. The exterior side of the pawl tip 46 defines an externally facing tube rejection surface 55. These surfaces operate in concert with a downstream platen (not shown). The shape of the arctuate section 44 of the pawl 36 is such that when the pawl 36 is fully lowered, the tube is firmly wedged against the downstream platen. The design and the function comprehended by tubeloader pawl tip 46 is repeated on the lower edge of an upper pump jaw 57.

When an operator is loading a tube into the infusion pump 10 and actuates the tubeloading cycle by means of an appropriate actuator, the tubeloader pawl tips 46 are lowered over the tube in the tube loading channel 27 which, in combination with the lowering of the upper jaw 57, serves to completely close off the tube loading channel 27 on the outboard side of the infusion pump 10. Should a tube be partially inserted into the infusion pump 10, yet remain wholly outside the tube loading channel 27, the tube reject surface 55 will operate to help expel the tube from the infusion pump 10. In the event a tube is loaded partially within the tube loading channel 27, the misload activating surface 54 will help to pinch the tube. When the tube is inserted into the tube loading channel 27 yet has not been fully drawn into the infusion pump 10, the tube capture surface 52 will serve to draw the tube rearwardly and thereby execute a correct loading of the tube. The combination of the tube reject surface 44, the misload activating surface 54 and the tube capture surface 52 provides for a sharp discontinuity between the various loading scenarios.

The vertical tube capture surface 52 additionally works in combination with the angled tube engaging surface 50 and the horizontal tube engaging surface 48 to hold the tube securely in the infusion pump 10. This combination also helps provide for a deformation of the tube by co-action of the angled surface 50 and the horizontal surface 48 to lock the tube securely into the infusion pump 10.

Figure 4:
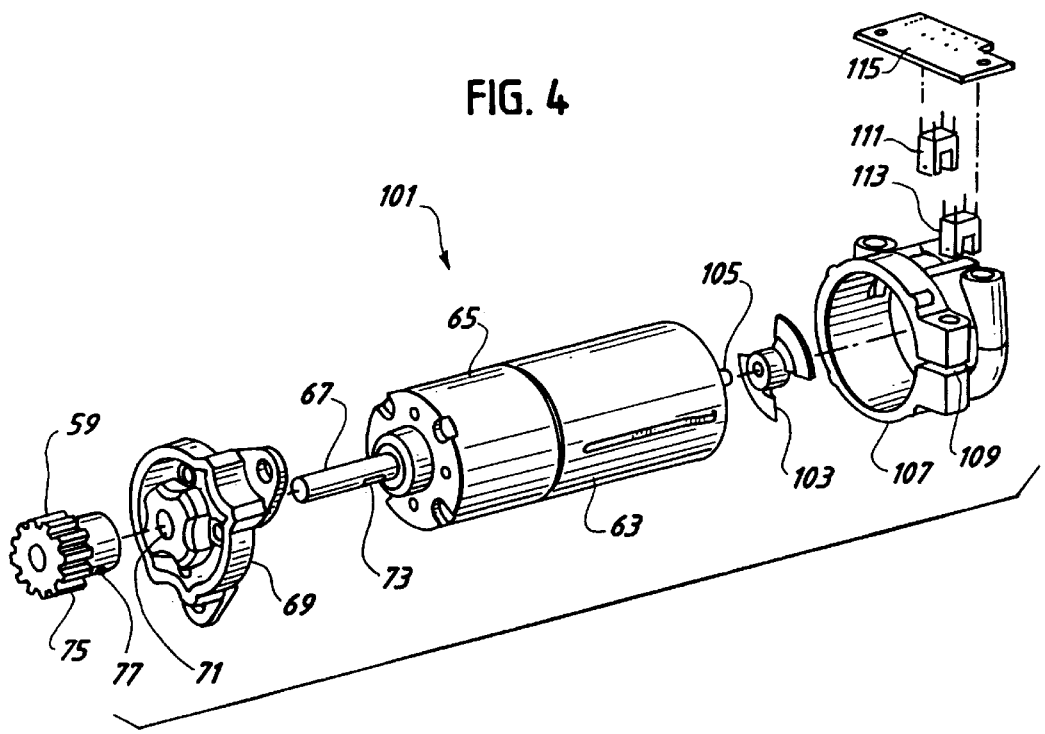
FIG. 4 is an exploded view of an encoder assembly made in accordance with the principles of the present invention.

Referring now to FIG. 3, two helical gears 59, 61 are provided in a perpendicular arrangement so as to transfer rotation from a tubeloader motor 63 to the transverse tubeloader camshaft 32. The tubeloader motor 63 is a motor. The tubeloader motor 63 further comprises a speed reduction gearset 65 operative to provide sufficient torque to rotate camshaft 32 against the drag placed thereon by the components in contact therewith and resident on layshaft 34. Referring now to FIG. 4, a tubeloader motor shaft 67 extends forwardly from the tubeloader motor 63 and passes through the tubeloader motor mount 69 by way of a central aperture 71. The tubeloader motor shaft 67 has a flat 73 defined therein which is operative to provide a seat for the tubeloader drive gear setscrew 75 which is inserted through a threaded setscrew aperture 77 in the tubeloader drive gear 59 and thereby fix the rotation of the tubeloader drive gear 59 to that of the tubeloader motor shaft 67.

Referring back to FIG. 3, the tubeloader drive gear 67 is a helical cut gear wherein the teeth are about the circumferential periphery thereof. These teeth engage corresponding teeth on the face of the tubeloader camshaft gear 61, thereby allowing perpendicular actuation of the transversely mounted camshaft 32 by the longitudinally mounted tubeloader motor 63. A handwheel 79 is provided which includes a housing for a pivoting clutch tab 80. In operation, actuation of the clutch tab 80 will cause the camshaft 32 to be freely rotated manually by means of handwheel 79 without rotating the camshaft gear 61.

The camshaft 32 supports two compound cams denoted as the downstream cam 82 and the upstream cam 84. The downstream and upstream cams 82, 84 comprise, moving outwardly from chassis, a camshaft deadstop 86, 88, which help to provide a positive stop for camshaft rotation, tubeloader pawl cams 90, 92, which serve to actuate the tubeloader pawls 36, valve loading cams 94, 96, which serve to lift valves out of the way during the loading operation, and sensor arm cams 98, 100 which is operative to raise or lower the downstream sensor.

Referring again to FIG. 4, an exploded view of an encoder assembly 101 made in accordance with the principles of the present invention is seen. The encoder assembly 101 comprises an encoder wheel 103 which is attached to the armature shaft 105 of motor 65. The encoder assembly 101 resides in a pump motor encoder support collar 107 which provides a sliding fit over motor housing 63 and is affixed thereto by a pinch clamp 109. Two optical couplers 111, 113 are provided which are electrically connected to the associated signal processing electronics by a printed circuit strip denoted as the pump sensor strip 115.

Figure 5:
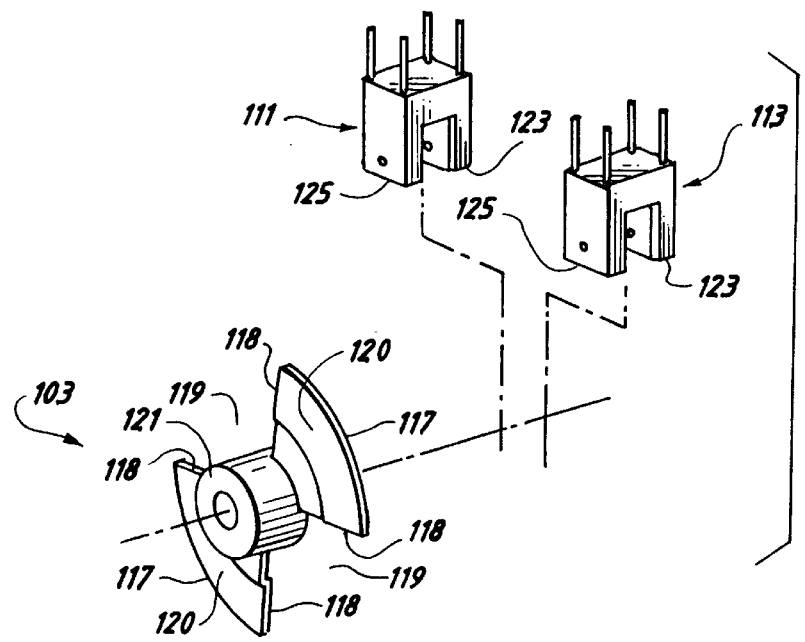
FIG. 5 is an exploded elevational view of an encoder wheel and sensors made in accordance with the principles of the present invention.

Referring to FIG. 5, the encoder wheel 103 is seen in detail. The encoder wheel 103 has, in the described embodiment of the instant invention, two flags 117 extending radially outwardly from the hub 121 thereof. Located between each flags are a plurality of equispace sectors 119.

While in the embodiment described herein each sector 119 is 90° wide, the present invention contemplates use of encoder wheels having any number of sectors and thus any width. Likewise while in the embodiment described herein each flag 117 between each sector 119 is 90° wide, the present invention contemplates use of encoder wheels having any number of flags and thus any width. The sectors 119 act to pass light while the flags 117 act to block light. Blocked light can be assigned a digital logic high or 1 reference while passed light can be assigned a digital logic low or 0 reference. These flags present a plurality of optical images. The first of these images is defined by the edge 118 of the individual flag 117. The second image is defined by the central area 120 of the flag 117.

The flags 117 act in concert with the two optical couplers 111, 113 to fix the location of the armature shaft 105 of the pump motor of FIG. 4. The spacing of the two optical couplers 111, 113 is provided to obtain the desired quadrature signals with the signals nominally 90° out of phase. Thus, the optical couplers 111, 113 are positioned such that when one is aligned with the edge of a flag 118, the other optical coupler is aligned with the center of a flag 120. In the embodiment described herein, the optical couplers are either 45° or 135° apart. If four flags and four sectors were employed, the optical couplers would be 22½°, 67½°, 112½° or 157½° apart to achieve the nominal 90° phase shift.

In a preferred embodiment, the optical couplers 111, 113 comprise a photo-electric switch. In a further preferred embodiment, the photo electric switches comprise a first photo diode 123 and a first photocell 125. The optical couplers 111, 113 are oriented to correspond with the plurality of flags 117 on the encoder wheel 103 thus acting to optically read the flags 117 and sectors 119. As described in detail below, the timing of the readings taken by optical couplers 111, 113 may be controlled by the pump module microprocessor or may be initiated by changes in the readings themselves. The optical readings of optical couplers are converted to digital signals by means of squaring circuits and input into a digital processor contained in the microprocessor. In this presently preferred embodiment, the resolution of encoder 103 is 1/960 of a rotation of tubeloader camshaft 32.

As will be appreciated by those skilled in the art, the exact configuration of the present embodiment can be readily altered while maintaining the desired effect of the present device. For instance, the optical couplers can be moved to an equivalent position which still provides the desired effect. Additionally, encoder wheels having any number of flags and sectors are contemplated as within the scope of the present invention. The present device can be coordinated with the use of different types of driving motors such as the driving motor of the pumping motion. Of course, these various configurations are contemplated within the scope of the present invention.

Figure 6:
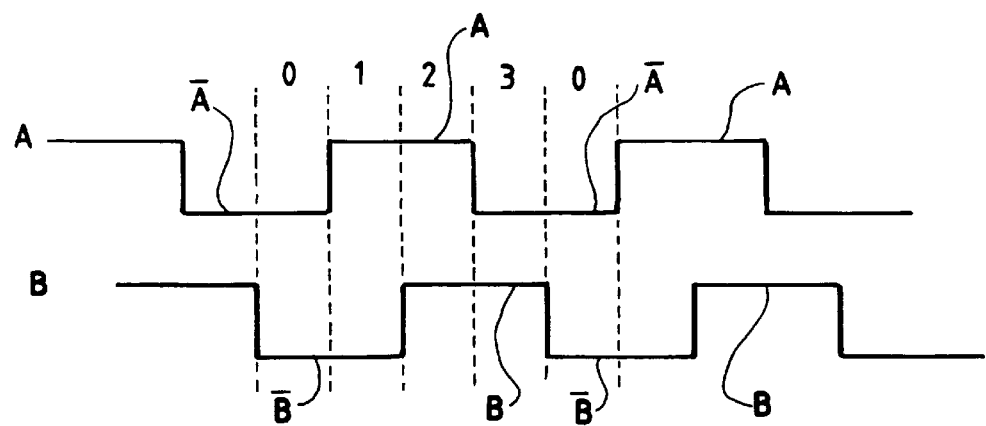
FIG. 6 is a schematic drawing of the state wave form of a conventional encoder/decoder.

As can be seen in FIG. 6, the waveform of a conventional encoder/decoder comprises two channels (A, B) wherein each channel has a first digital logic high state and a second digital logic low state. Thus, in the conventional design, the state definition correspond to four distinct states. In the first state, defined as State 0, both channels (A, B) are at a digital logic low (e.g. A, B). In state 1, the first channel (A) is at a digital logic high while the second channel (B) is at a digital logic low (e.g. A, B). The state transition from state 0 to state 1 occurs when the first optical coupler 111 detects the transition from a sector 119 to a flag 117.

In state 2, the first channel (A) is at a digital logic high and the second channel (B) is at a digital logic high (e.g. A, B). The transition from state 1 to state 2 occurs when the second optical coupler 113 detects the transition from a sector 119 to a flag 117. In state 3, the first channel (A) is at a digital logic low while the second channel (B) is at a digital logic high (e.g. A, B). The state transition from state 2 to state 3 occurs when the first optical coupler 60 detects the transition from a flag 117 to a sector 119.

After state 3, the state definition returns to state 0, with both channels (A, B) at a digital logic low (e.g. A, B). The state transition from state 3 to state 0 occurs when the second optical coupler 113 detects the transition from a flag 117 to a sector 119. Subsequent state transitions repeat this pattern. This conventional design necessitates use of a clock state machine such as a decoder counter to keep successive counts in an internal register. For example, a typical decoder counter which was utilized in conventional designs was a Hewlett Packard HTCL 2000. The decoder counter includes means to address the metastability states which may occur within the decoder counter internal logic during state transitions.

In the present invention, two state waveforms (A', B') provide two encoder outputs. However, in the present invention the state determination is self-clocking. In the present invention, a state change in one of the waveforms (A', B') is registered as an interrupt or internal control signal in the microprocessor. Rather than using an external clock or register, the associated software recognizes each interrupt and causes a state change in the microprocessor itself.

Figure 7:
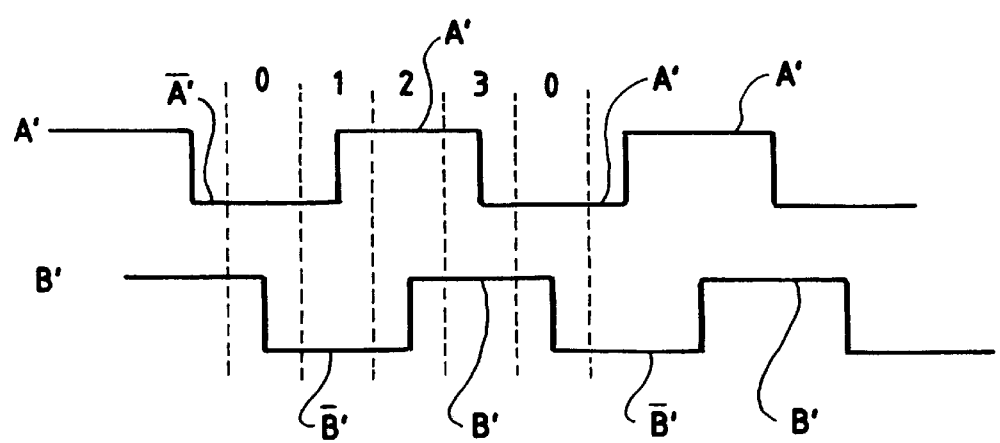
FIG. 7 is a schematic drawing of the state wave form of an encoder/decoder made in accordance with the principles of the present invention.

Referring to FIG. 7, as determined by the method of the present invention, state 0 is defined when the second optical coupler 113 detects the transition from a flag 117 to a sector 119 or vice versa and the first optical coupler 111 detects the midpoint of a sector 119. State 1 is defined when the first optical coupler 111 detects a transition from a sector 119 to a flag 117 or vice versa and the second optical coupler 113 detects the mid point of a sector 119. State 2 is defined when the second optical coupler 113 detects a transition from a sector 119 to a flag 117 or vice versa and the first optical coupler 111 detects the midpoint of a flag 117.

State 3 is defined when the first optical coupler 111 detects a transition from a flag 117 to a sector 119 or vice versa and the second optical coupler 113 detects the midpoint of a flag 117. After state 3, the state definition returns to state 0. This arises when the second optical coupler 113 detects a transition from a flag 117 to a sector 119 and the first optical coupler 111 detects the midpoint of a sector 119. Thus, by using the edge of a flag 117 or sector 119 to clock a reading of the state based on the opposite, non-changing signal, as opposed to using the edge of a flag or sector to define the state transition, the present invention avoids the metastability issue without the use of expensive hardware. In addition, the present invention retains the ability of the encoder/decoder to derive rotational directional information.

Figure 8A:
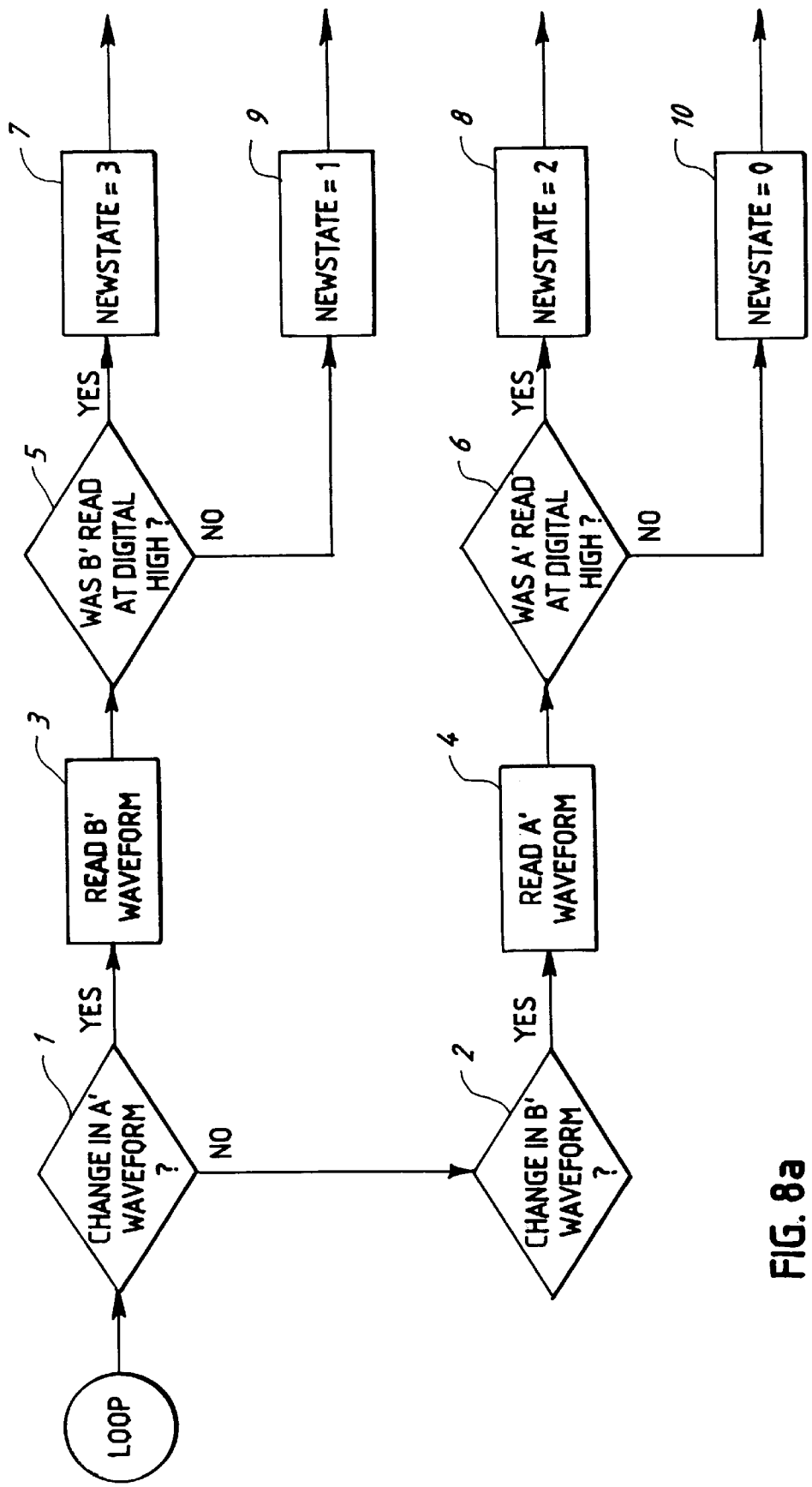
FIG. 8 is a flow chart of a method of monitoring in accordance with the principles of the present invention.
Figure 8B:
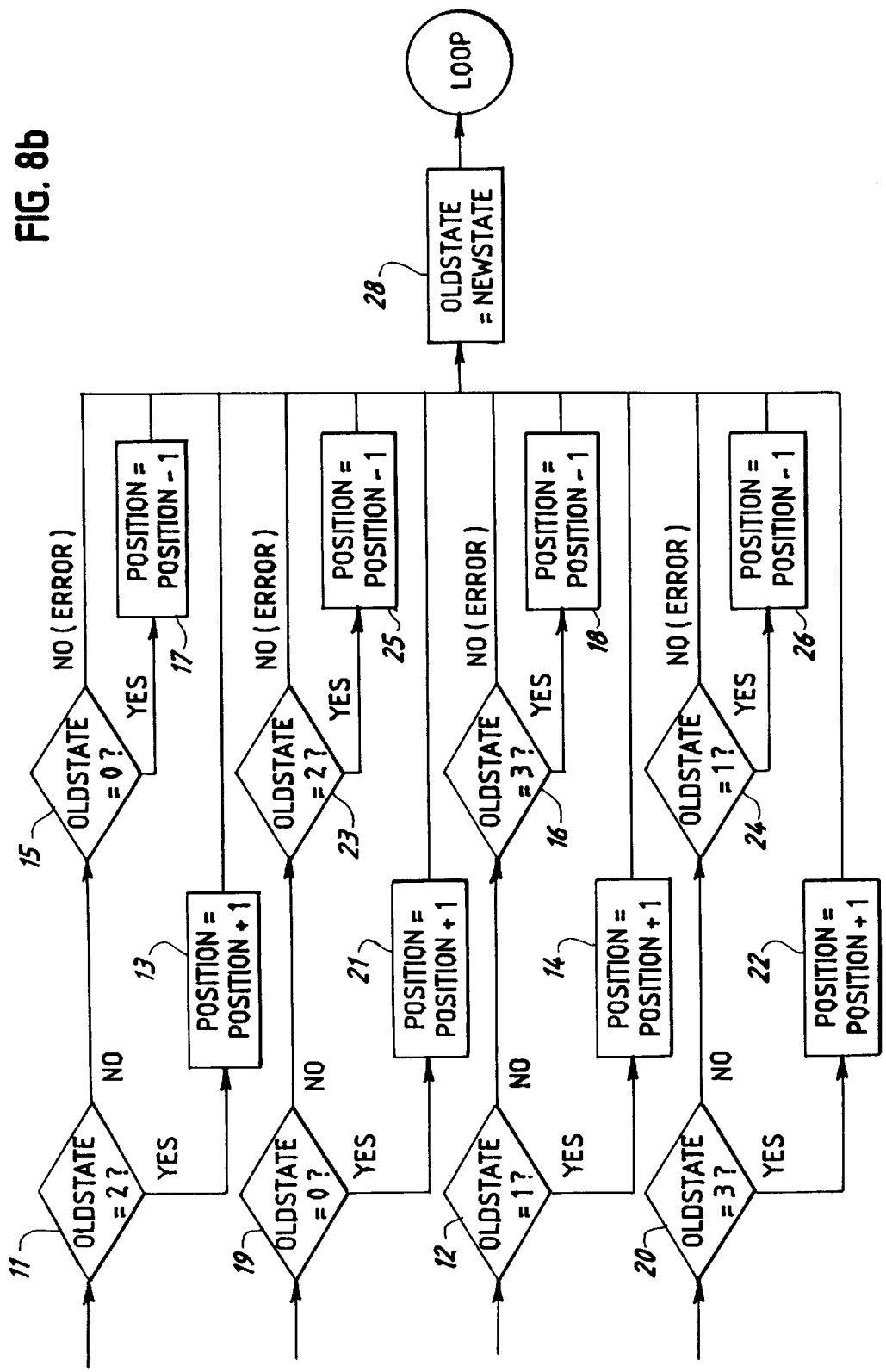

Referring to FIG. 8, the method of the present invention is described. While operating on a continuous loop, the optical sensors sense changes in the A' or B' waveforms. This occurs if the optical sensor detects a transition from a flag 117 to a sector 119 or a sector 119 to a flag 117. If a change is sensed in the A' waveform, at step 1, the B waveform is sampled in step 3. If a change is not sensed on the A' waveform, at step 1, the B' waveform is sensed, at step 2. If a change is sensed in the B' waveform, at step 2, the A' waveform is sampled at step 4.

The method includes three variables: the newstate variable, the oldstate variable and the position variable. If at step 5 the B' waveform is at a digital high, at step 7 newstate is defined as three (3). If at step 5 the B' waveform is at a digital low, at step 9 newstate is defined as one (1). If at step 6 the A' waveform is at a digital high, at step 8 newstate is defined as two (2). If at step 6 the A' waveform is at a digital low, at step 10 newstate is defined as zero (0).

With newstate defined at step 7 as three (3), oldstate is read at step 11. If oldstate is two (2), at step 13 the position variable is incremented by one, and the oldstate variable is set to the newstate variable value of three (3), at step 28. After setting the oldstate variable, the loop continues. If oldstate at step 11 is not two (2), then oldstate is again tested at step 15. If at step 15 oldstate is zero (0), then at step 17 the position variable is decremented by one, and the oldstate variable is reset to the newstate variable value of three (3), at step 28. After setting the oldstate variable, the loop continues. If at step 15 oldstate is not zero (0), a state change in the waveform has been missed or the waveform has been misread and an error condition occurs.

With newstate defined at step 9 as one (1), oldstate is tested at step 19. If oldstate is zero (0), at step 21 the position variable is incremented by one, and the oldstate variable is set to the newstate variable value of zero (0), at step 28. After setting the oldstate variable, the loop continues. If oldstate at step 19 is not zero (0), then oldstate is again tested at step 23. If at step 23 oldstate is two (2), then at step 25 the position variable is decremented by one, and the oldstate variable is reset to the newstate variable value of zero (0), at step 28. After setting the oldstate variable, the loop continues. If at step 23 oldstate is not two (2), a state change in the waveform has been missed or the waveform has been misread and an error condition occurs.

With newstate defined at step 8 as two (2), oldstate is tested at step 12. If oldstate is one (1), at step 14 the position variable is incremented by one, and the oldstate variable is set to the newstate variable value of two (2), at step 28. After setting the oldstate variable, the loop continues. If oldstate at step 12 is not one (1), then oldstate is again tested at step 16. If step 16 oldstate is three (3), then at step 18 the position variable is decremented by one, and the oldstate variable is set to the newstate variable value of two (2), at step 28. After setting the oldstate variable, the loop continues. If at step 16 oldstate is not three (3), a state change in the waveform has been missed or the waveform has been misread and an error condition is designated.

With newstate defined at step 10 as zero (0), oldstate is tested at step 20. If oldstate is three (3), at step 22 the position variable is incremented by one, and the oldstate variable is set to the newstate variable value of zero (0), at step 28. After setting the oldstate variable, the loop continues. If oldstate at step 20 is not three (3), then oldstate is again tested at step 24. If at step 24 oldstate is one (1), then at step 26 the position variable is decremented by one, and the oldstate variable is set to the newstate variable value of zero (0), at step 28. After setting the oldstate variable, the loop continues. If at step 24 oldstate is not one (1), a state change in the waveform has been missed or the waveform has been misread and an error condition is designated.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be within the scope of the claims.

What is claimed is:

1. A monitor for monitoring the position of a motor shaft comprising:

an encoder wheel connected to the motor shaft, the encoder wheel defining at least one blocking area and at least one non-blocking area;

a first detector for detecting a transition selected from the group consisting of a transition from a blocking area to a non-blocking area and a transition from a non-blocking area to a blocking area of the encoder wheel;

a second detector circumferentially offset from the first detector, the second detector detecting the presence or absence of the blocking area of the encoder wheel;

means for correlating the position of the motor shaft to one of a plurality of states defined by the readings of the first and second detectors; and means within the correlating means for transitioning from one state to another state when a transition between a blocking area and a non-blocking area is detected by the first detector and for determining the state by the presence or absence of the blocking area as detected by the second detector.

2. The monitor of claim 1 wherein the encoder wheel contains a plurality of blocking and non-blocking areas.

3. The monitor of claim 1 wherein the detectors are optical couplers.

4. The monitor of claim 3 wherein the optical coupler comprises a photo diode and a photo cell.

5. The monitor of claim 1 wherein at least two states are defined.

6. The monitor of claim 5 where four states are defined.

7. The monitor of claim 1 wherein the correlating means is a microprocessor.

8. The monitor of claim 1 wherein the motor shaft is in an infusion pump.

9. The monitor of claim 8 further wherein the motor shaft is connected to a tube loading motor.

10. A method for monitoring the position of a motor shaft comprising:

defining at least one blocking area and at least one non-blocking area of an encoder wheel connected to the motor shaft;

detecting a transition selected from the group consisting of a transition from a blocking area to a non-blocking area and a transition from a non-blocking area to a blocking area of the encoder wheel;

detecting in a second location circumferentially offset from the first detecting step the presence or absence of the blocking area of the encoder wheel;

correlating the position of the motor shaft to one of a plurality of states defined by the readings of the first and second detections; and transitioning from one state to another when a transition between a blocking area and a non-blocking area is detected by the first detection and for determining the state by the presence or absence of the blocking area as detected by the second detection.

11. The method of claim 10 further including the steps of defining at least two states.

12. The method of claim 11 further including the steps of defining at least four states.

13. A monitor for monitoring the position of a motor shaft comprising:

an encoder wheel connected to the motor shaft, the encoder wheel defining at least one blocking area and at least one non-blocking area;

a first detector which detects a transition selected from the group consisting of a transition from a blocking area to a non-blocking area and a transition from a non-blocking area to a blocking area of the encoder wheel;

a second detector circumferentially offset from the first detector, the second detector detecting the presence or absence of the blocking area of the encoder wheel;

a correlator which correlates the position of the motor shaft to one of a plurality of states defined by the readings of the first and second detectors; and the correlator comprising a transitioner which transitions from one state to another state when a transition between a blocking area and a non-blocking area is detected by the first detector and a determiner which determines the state by the presence or absence of the blocking area as detected by the second detector.

14. The monitor of claim 13 wherein the encoder wheel contains a plurality of blocking and non-blocking areas.

15. The monitor of claim 13 wherein the detectors are optical couplers.

16. The monitor of claim 15 wherein the optical coupler comprises a photo diode and a photo cell.

17. The monitor of claim 13 wherein at least two states are defined.

18. The monitor of claim 13 where four states are defined.

19. The monitor of claim 13 wherein the correlator is a microprocessor.

20. The monitor of claim 13 wherein the motor shaft is in an infusion pump.

21. The monitor of claim 20 further wherein the motor shaft is connected to a tube loading motor.

* * * * *